United States Patent [19]

Brunnschweiler et al.

[11] E Patent Number: Re. 32,058

[45] Reissued Date of Patent: Dec. 31, 1985

[54] WEIGHING CONTROLLING FLOW RATE WITH TARING BETWEEN WEIGHINGS

[76] Inventors: David Brunnschweiler, Balderstone Lodge, Commons La., Balderstone, Blackburn, Lancashire; Barrie Sedgely, 5, Grange Way, Sandbach, Cheshire, both of England

[21] Appl. No.: 568,916

[22] Filed: Jan. 6, 1984

Related U.S. Patent Documents

Reissue of:

[64] Patent No.: 4,366,872
Issued: Jan. 4, 1983
Appl. No.: 190,965
Filed: Sep. 26, 1980

[30] Foreign Application Priority Data

Oct. 18, 1979 [GB] United Kingdom ..... 7936211

[51] Int. Cl.[4] ..... G01G 19/22; G01G 13/24; G01G 13/14; B67D 5/08

[52] U.S. Cl. ..... 177/1; 177/70; 177/114; 177/165; 222/56

[58] Field of Search ..... 177/1, 50, 70, 165, 177/114, 25; 222/55, 56

[56] References Cited

U.S. PATENT DOCUMENTS

| | | | |
|---|---|---|---|
| 2,037,484 | 4/1936 | Raymer et al. . | |
| 3,091,301 | 5/1963 | Stone . | |
| 3,142,323 | 7/1964 | Metzler . | |
| 3,498,395 | 3/1970 | Henry | 222/56 X |
| 3,522,853 | 8/1970 | Fluur et al. | 177/165 X |
| 3,659,665 | 5/1972 | Godwin et al. . | |
| 3,708,027 | 1/1973 | Hill | 177/70 X |
| 3,731,754 | 5/1973 | Godwin et al. | 177/165 |
| 3,834,473 | 9/1974 | Girard et al. . | |
| 3,995,517 | 12/1976 | Smith | 177/50 X |
| 4,137,976 | 2/1979 | Grayson, Jr. | 177/1 |
| 4,143,724 | 3/1979 | Itani . | |
| 4,144,943 | 3/1979 | Gallo | 177/50 X |
| 4,234,102 | 11/1980 | Spurgeon | 222/55 |
| 4,272,824 | 6/1981 | Lewinger et al. | 177/50 X |

FOREIGN PATENT DOCUMENTS

| | | |
|---|---|---|
| 408414 | 1/1933 | United Kingdom . |
| 922851 | 2/1959 | United Kingdom . |
| 1044541 | 3/1963 | United Kingdom . |
| 1193651 | 5/1966 | United Kingdom . |
| 1154636 | 9/1967 | United Kingdom . |
| 1319221 | 1/1971 | United Kingdom . |
| 1433101 | 1/1974 | United Kingdom . |

*Primary Examiner*—George H. Miller, Jr.
*Attorney, Agent, or Firm*—Oblon, Fisher, Spivak, McClelland & Maier

[57] ABSTRACT

A weighpan is controlled by a microprocessor to tare itself between successive weighings and the microprocessor resets the weight at which supply to the weighpan is regulated in accordance with a shortfall or excess delivered on previous weighings.

2 Claims, 1 Drawing Figure

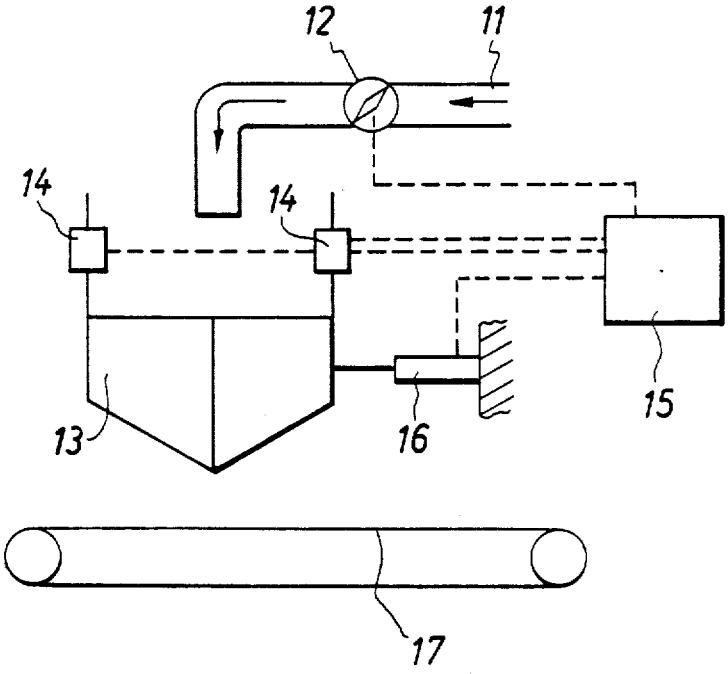
12
11
14
14
13
16
15
17

WEIGHING CONTROLLING FLOW RATE WITH TARING BETWEEN WEIGHINGS

Matter enclosed in heavy brackets [ ] appears in the original patent but forms no part of this reissue specification; matter printed in italics indicates the additions made by reissue.

This invention relates to regulating the supply of material by weighing a succession of similar quantities of material. Such method might be practised in connection with the supply of fibres to a carding machine for use in the manufacture of spun yarn or of stitch bonded fibre fleece fabric.

In such a context fibres are dropped on to a weighpan, the supply being cut off when the indicated weight reaches a certain value. The fibres are then dropped or pushed off the loaded weighpan, and loading of the next batch begins anew.

Although quite sensitive weighpans have been developed, the weighing process remains less than satisfactory as a method of regulating the supply of material. For one thing, the tare weight of the weighpan can change because of fibres randomly caught and carried by the weighpan through a number of successive weighings. On top of that there is a time lag between the weight on the weighpan reaching a predetermined value and the moment when that weight actually stops increasing. This results in an "overshoot" of unpredictable size that results in an excess or a shortfall of material as compared with what is desired.

The invention provides a system by which these shortcomings can be avoided and which better regulates the supply of material.

The invention comprises a method for regulating the supply of material in which a succession of similar quantities of material is weighed at a point in the supply line, the material being loaded on to a weighpan and the loading cut-off when a preset weight is reached when the weighpan is cleared for the next weighing, characterised in that the weighpan is tared at intervals during the operation and the delivery of material at each weighing is controlled by the amount delivered in a previous weighing or weighings.

Advantageously, the weighpan is tared after each clearing.

The delivery of material at each weighing may be controlled by determining the amount of material called for, or by determining the period between successive weighings—or by a combination of both of these methods.

The implementation of the method according to the invention is probably best achieved, in most cases, by microprocessor control. The microprocessor can most simply be connected to the weighpan where existing equipment is to be converted to operate according to the invention. The weighpan already actuates the cut-off of supply to itself, and the simplest application is the interposition of the microprocessor between the weighpan and the supply cut-off. Taring is simply a matter of re-zeroing so that the cut-off signal is given when a predetermined weight increment is reached, rather than a predetermined total weight.

One embodiment of a system for regulating the supply of material in accordance with the invention will now be described with reference to the accompanying drawing in which the single FIGURE is a diagrammatic illustration.

The FIGURE illustrates a fibre delivery duct 11 with a valve 12 that can be opened and closed to control the flow of fibres to a weighpan 13. The weighpan 13 has, as shown, two load cells 14—though of course any number, usually up to four, can be used according to conventional practice. The load cells 14 are connected to a microprocessor 15 programmed to control the operation in a way to be described in more detail below.

Clearing of fibres from the weighpan 13 after each weighing is effected by an hydraulic or pneumatic weighpan-dumping arrangement 16 that opens the clamshell like pan 13 and drops its load on to a conveyor 17 for removal to some point at which the fibres are put to use.

In operation, the system is similar to the usual system in which, when the weight of fibre in the weighpan 13 reaches the preset value, a signal is given to shut the valve 12. Although no more fibre flows past the valve 12, however, fibre that has already passed the valve before it closed but after the pan reached the preset weight, continues to fall on to the pan making it overshoot the preset weight. The fibres in the weighpan 13 are now dumped on to the conveyor 17 by actuation of the arrangement 16.

However, the new system differs in two material aspects. First is that the weighpan 13 is tared between successive weighings. Previously, fibre being what it is, would get caught on any snags or projections on the weighpan and build up over a period of time. This altered the tare weight of the weighpan 13, and this effectively altered the preset weight increment required to actuate the cut-off.

Fibre that gets caught in this way in the new system is of no account in regard to the preset weight increment—the microprocessor 15 automatically resets the starting point to zero before each weighing and then actuates the valve 12 only when the preset weight increment has been reached. In this way, the weighpan is tared without its weight actually being observed.

The other difference lies in this, that the microprocessor automatically resets the weight increment at which the valve is closed, in accordance with what happened in a previous weighing or on previous weighings.

According to one arrangement, the microprocessor would operate thus: If the system calls for a weight of 1 kg to be delivered each minute, the arrangement would be set to a one minute operating cycle. On the first weighing let us suppose there is an overshoot that puts a 100 gramme excess into the weighpan. The microprocessor now resets the system so that on the next weighing, the valve 12 is closed after only 800 grammes have been loaded. Assuming there is now an overshoot of 100 grammes, the actual amount dumped (assuming no fibres are caught on the weighpan) will be 900 grammes. This brings the total for two drops to 2000 grammes—as required.

If the microprocessor now adjusts the system in accordance with the last preceding drop, it will close the valve after 1000 grammes have been loaded, expecting the same overshoot of 100 grammes to bring the total up to 1100 grammes. On the following drop, it will cut back the valve-closing point to 800 grammes again to give a total of 900, again averaging out the drop rate to 1000 grams/minute. Of course if there is any variation in the tare weight of the weighpan or in the amount of the overshoot, these will also be compensated for.

An alternative way of proceeding is to arrange for the valve 12 to be open for a fixed period of time, so as to deliver an approximately uniform amount of fibre at each weighing, but to regulate the frequency at which the valve is opened in accordance with the error between the desired and the actual delivery.

The improved accuracy obtained in accordance with the invention is especially useful in blending fibres.

The microprocessor used can be assembled from readily available components and programmed to suit particular requirements in accordance with known principles of microprocessor technology. If a large enough capacity is provided, the same microprocessor can control the activity at a number of weighpans, and it may have a visual display unit (VDU) to indicate the system settings and the state of affairs at any weighpan. It can also log the activity for record and inventory purposes.

The use of the system is not of course restricted to weighing fibres for textile purposes. The invention is applicable to weighing out all manner of particulate or "flowable" materials that present problems using conventional methods.

The description with reference to the drawing is, of course, by way of illustration of the principles involved rather than being a description of any particular embodiment. Thus, where we refer to a "valve" it is to be understood that this stands for any arrangement that can be controlled to feed or admit material. In the case of textile fibres, the "valve" would usually be a spiked lattice that is set in motion to feed fibres and stopped when the feed is to be interrupted.

One or more alarms can be built into the system to warn, for example, of over—or underweight batches outside predetermined limits, or of malfunction of some aspect of the system.

What we claim is:

1. A method for regulating the continuous supply of material, comprising the steps of:

*(a)* taring a weighpan;

*(b)* loading a first quantity of material in said weighpan;

*(c)* comparing the weight of said first quantity with a desired weight and determining the difference;

*(d)* discharging said first quantity to a subsequent process requiring a consistent quantity of said material per unit time;

[taring said weighpan;]

*(e)* determining a second quantity based upon comparing said difference and said desired quantity;

*(f)* loading said second quantity of material in said weighpan;

*(g)* discharging said second quantity to said process; and

*(h)* repeating [the above] steps *b through g* whereby a consistent quantity of material is delivered to said subsequent process.

2. A method for regulating the continuous supply of material, comprising the steps of:

*(a)* taring a weighpan;

*(b)* loading a first quantity of material in said weighpan in a first unit of time;

*(c)* comparing the weight of said first quantity with a desired weight and determining the difference;

*(d)* discharging said first quantity to a subsequent process requiring a consistent quantity of said material per unit time;

*(e)* after a second period of time, repeating [the above] steps *b through d* while varying said second period of time based upon said difference, whereby a consistent quantity of material over time is delivered to said subsequent process.

* * * * *

UNITED STATES PATENT AND TRADEMARK OFFICE

CERTIFICATE OF CORRECTION

PATENT NO. : Re. 32,058

DATED : December 31, 1985

INVENTOR(S) : Brunnschweiler et al.

It is certified that error appears in the above-identified patent and that said Letters Patent is hereby corrected as shown below:

In the Title of Invention [54], delete "TARING BETWEEN WEIGHINGS" and insert therefor --INITIAL TARING--.

In the ABSTRACT [57], lines 1 and 2, delete "to tare itself between successive weighings and" and insert therefor --initially taring the weighpan;--.

Signed and Sealed this

*Ninth* Day of *September 1986*

[SEAL]

*Attest:*

DONALD J. QUIGG

*Attesting Officer*

*Commissioner of Patents and Trademarks*